United States Patent
Griffin et al.

(10) Patent No.: US 12,071,974 B2
(45) Date of Patent: Aug. 27, 2024

(54) ECCENTRIC BUSHING FOR REDUNDANT PINNING OF REMOVABLE PANELS

(71) Applicant: Raytheon Company, Waltham, MA (US)

(72) Inventors: Eric J. Griffin, Rancho Palos Verdes, CA (US); Aryan Blourchian, Mission Viejo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 539 days.

(21) Appl. No.: 17/322,831

(22) Filed: May 17, 2021

(65) Prior Publication Data

US 2022/0364585 A1  Nov. 17, 2022

(51) Int. Cl.
| | |
|---|---|
| F16B 5/02 | (2006.01) |
| E04F 13/08 | (2006.01) |
| F16B 12/20 | (2006.01) |
| F16C 23/10 | (2006.01) |

(52) U.S. Cl.
CPC .......... *F16B 5/025* (2013.01); *E04F 13/0833* (2013.01); *F16B 5/0216* (2013.01); *F16B 12/2009* (2013.01); *F16C 23/10* (2013.01); *F16B 2200/406* (2018.08)

(58) Field of Classification Search
CPC ............................ F16B 5/0216; E04F 13/0833
See application file for complete search history.

(56) References Cited

U.S. PATENT DOCUMENTS

| | | | | | |
|---|---|---|---|---|---|
| 2,216,208 | A | * | 10/1940 | Michon | B21D 28/34 403/DIG. 8 |
| 2,592,237 | A | * | 4/1952 | Bradley | F04B 1/053 74/570.21 |
| 4,095,856 | A | * | 6/1978 | Markovitz | B01J 19/18 422/224 |
| 4,613,000 | A | * | 9/1986 | Moore | F16B 5/025 173/217 |
| 5,141,357 | A | * | 8/1992 | Sherman | F16B 5/025 403/4 |

(Continued)

FOREIGN PATENT DOCUMENTS

| | | |
|---|---|---|
| CN | 1877142 A | 12/2006 |
| CN | 203345196 U | 12/2013 |

(Continued)

*Primary Examiner* — Matthew R McMahon
(74) *Attorney, Agent, or Firm* — CANTOR COLBURN LLP

(57) ABSTRACT

An eccentric bushing assembly comprises an outer eccentric bushing configured to be disposed in an opening of a panel comprising a central axis. The outer eccentric bushing is operable to float axially, rotate circumferentially, and to move radially with respect to the central axis. The eccentric bushing assembly further comprises an inner eccentric bushing disposed radially inward from the outer eccentric bushing and interfacing with the outer eccentric bushing, the inner eccentric bushing is operable to rotate relative to the outer eccentric bushing. The eccentric bushing assembly further comprises a spherical bushing comprising a through hole operable to receive a connecting pin therein and to rotate in at least one degree of freedom. The rotation of the spherical bushing can facilitate alignment of an axis of the pin with the through hole.

13 Claims, 6 Drawing Sheets

(56) References Cited

U.S. PATENT DOCUMENTS

| | | | |
|---|---|---|---|
| 6,811,117 B2 | 11/2004 | Reniau | |
| 7,406,777 B2 * | 8/2008 | Grover | B23P 9/025 |
| | | | 33/645 |
| 7,455,471 B2 * | 11/2008 | Gawehn | F16B 5/025 |
| | | | 411/398 |
| 8,991,759 B2 * | 3/2015 | Garcia | B64C 1/0685 |
| | | | 244/119 |
| 9,698,588 B2 | 7/2017 | Romano | |
| 10,125,800 B1 * | 11/2018 | Dominguez | B25B 13/481 |
| 11,608,855 B2 * | 3/2023 | Harleman | F16C 41/008 |
| 2004/0062462 A1 | 4/2004 | Jacquet et al. | |
| 2020/0217434 A1 | 7/2020 | Bailey | |
| 2020/0307764 A1 | 10/2020 | Padovani et al. | |

FOREIGN PATENT DOCUMENTS

| | | | | |
|---|---|---|---|---|
| DE | 1525178 A1 * | 11/1969 | | F16C 23/10 |
| DE | 19806839 A1 * | 8/1999 | | F16C 23/045 |
| EP | 1751432 B1 | 7/2008 | | |
| JP | 56101418 A * | 8/1981 | | F16C 23/10 |
| WO | WO-2008115082 A1 * | 9/2008 | | F16B 43/00 |
| WO | WO 2014/161562 A1 | 10/2014 | | |

* cited by examiner

_US 12,071,974 B2_

ECCENTRIC BUSHING FOR REDUNDANT PINNING OF REMOVABLE PANELS

GOVERNMENT LICENSE RIGHTS

This invention was made with government support under Contract No. 2018-660-004. The government has certain rights in the invention

BACKGROUND

In some application, panels are required to be attached to an underlying support structure in a vertical or generally vertical configuration, such that a shear force is transferred from the panel to the underlying support structure. In many such applications, multiple pins can be used to attach the panel to the underlying support structure. In such applications, due to normal variations from a nominal or optimal position of each pin, the attachment of the panel can be over constrained and can rely on friction between the panel and the underlying support structure to transfer the shear force from the panel to the underlying support structure. In such a situation, it can be difficult to remove the panels from the underlying support structure after attachment.

For example, a panel with multiple pins cannot be installed without excessive clearance at the openings in the panel to receive the pins. This excessive clearance, however, negates the shear transfer properties of the pin, relying on friction instead. Openings in the panels without excessive clearances can prevent the panel from being installed due to the variations from a nominal or optimal position in each pin. Where drilled pin holes are matched between the panel and the underlying support structure, the matched drilled pin holes prevent the panel from being removed unless the pins are also themselves individually removable.

In light of the above, different strategies have been used to attach a panel an underlying support structure. In some applications, a single eccentric bushing can be provided on each side of a panel to attach the panel to two pins. This approach can facilitate alignment of two holes with two pins even with variations in position. However, it is not suitable for applications with fixed pins, being useful only for single removable pins. Further, removal of the panel will be impeded by perpendicularity tolerances.

Other examples can rely on liquid shimming to facilitate a plurality of pins into oversized holes. The liquid shim can be provided to remove the clearance and achieve shear transfer from the panel to the underlying support structure. However, with a plurality of pins, it is generally impossible to remove the shear panel intact after it is assembled to the underlying support structure.

Other approaches can incorporate pin holes having oversized holes or pin slots to permit variances in positions of the pins. However, this approach can result in only a single pin taking on the shear force created by the panel and can also limit designs to loading only two pins. This approach is also sensitive to perpendicularity errors in the pins. Match drilled pin sets require the pins be removable, and is incompatible with fixed pin structures. Match drilling is also susceptible to minor shifts and distortions of the frame, making it impossible to reassemble. Match drilling also requires machining operations at the assembly level, incurring additional manufacturing expense and risk of contamination to near finished components (e.g. panels). Thus, each of these approaches has several drawbacks when attempting to transfer shear from a panel to the underlying support structure.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
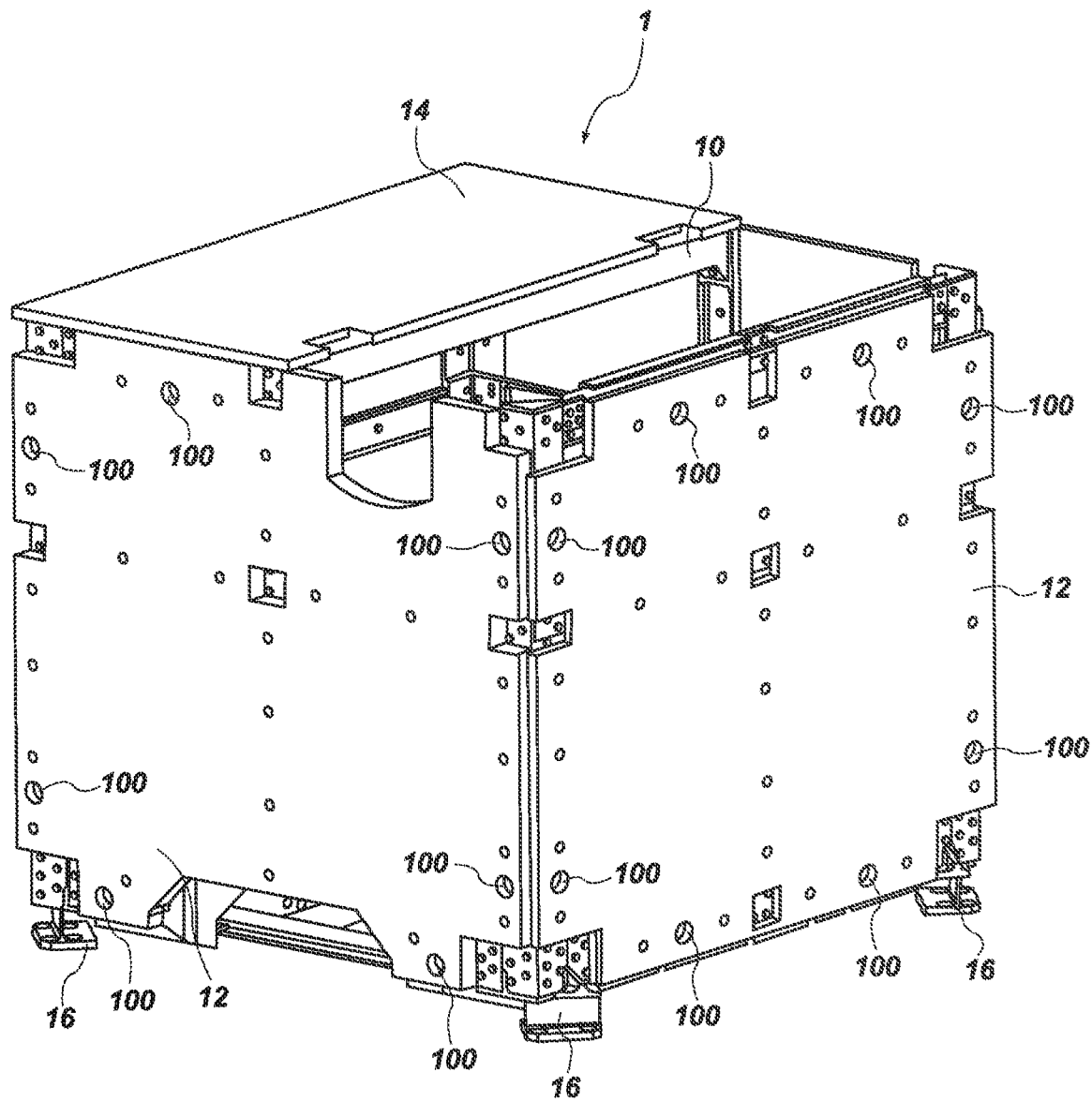
FIG. 1 is an isometric view of an exemplary system for transferring shear to an underlying support structure in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In one example of the present disclosure, an eccentric bushing assembly is provided. The eccentric bushing assembly can comprise an outer eccentric bushing configured to be disposed in an opening of a panel. The opening can comprise a central axis, and the outer eccentric bushing can be operable to float axially, rotate circumferentially, and to move radially with respect to the central axis.

The eccentric bushing assembly can further comprise an inner eccentric bushing disposed radially inward from the outer eccentric bushing and interfacing with the outer eccentric bushing. The inner eccentric bushing can be operable to rotate relative to the outer eccentric bushing.

The eccentric bushing assembly can further comprise a spherical bushing comprising a through hole operable to receive a connecting pin therein. The spherical bushing can interface with the inner eccentric bushing and can be operable to rotate in at least one degree of freedom. The rotation of the spherical bushing can facilitate alignment of an axis of the pin with the through hole. Further, relative rotation of the outer eccentric bushing and the inner eccentric bushing can facilitate the through hole of the spherical bushing to be radially positioned both centered and off-centered with respect to the central axis.

In one example, the outer eccentric bushing can comprise an outer radial tapered surface. The outer radial tapered surface of the outer eccentric bushing can be configured to interface with a corresponding tapered inner surface of the opening of the panel to limit radial movement of the outer eccentric bushing.

In one example, the corresponding tapered inner surface of the opening of the panel can terminate at a seating surface of the panel perpendicular to the central axis. The relative rotation of the outer eccentric bushing and the inner eccentric bushing can facilitate the through hole of the spherical bushing to be radially positioned in one of a centered and an off-centered position with respect to the central axis when the outer eccentric bushing and the inner eccentric bushing are seated against the seating surface.

In one example, the eccentric bushing assembly can comprise a fastener interfacing with the outer eccentric bushing to retain the outer eccentric bushing, the inner eccentric bushing, and the spherical bushing. The fastener can be operable to be positioned at a first position interfacing with the outer eccentric bushing to lock a position of the outer eccentric bushing, the inner eccentric bushing, and the spherical bushing against the seating surface. The fastener can also be positioned at a second position to allow the outer eccentric bushing to float axially and move radially with respect to the central axis.

In one example, the fastener can be a threaded fastener that threads into the opening of the panel and interfaces with a top surface of the outer eccentric bushing.

In another example, the fastener can comprise a conical surface, the outer eccentric bushing can comprise a flexure tab, and the opening of the panel can comprise an inner radial flange. The conical surface of the fastener can engage with the flexure tab upon at least partial insertion of the fastener into the outer eccentric bushing. The engagement of the flexure tab with the conical surface of the fastener can cause the flexure tab to engage with the inner radial flange.

In one example, the eccentric bushing assembly can comprise an outer sleeve interfacing with the opening of the panel. The outer sleeve can comprise a tapered inner surface that interfaces with the outer radial tapered surface of the outer eccentric bushing to limit radial movement of the outer eccentric bushing.

In one example, the sleeve can further comprise a seating surface that is adjacent to the tapered inner surface. The seating surface can be perpendicular to the central axis. The relative rotation of the outer eccentric bushing and the inner eccentric bushing can facilitate the through hole of the spherical bushing to be radially positioned in one of a centered and off-centered position with respect to the central axis when the outer eccentric bushing and the inner eccentric bushing are seated against the seating surface.

In one example, the eccentric bushing assembly can comprise a fastener interfacing with the outer eccentric bushing to retain the outer eccentric bushing, the inner eccentric bushing, and the spherical bushing. The fastener can be operable to be positioned at a first position interfacing with the outer eccentric bushing to lock a position of the outer eccentric bushing, the inner eccentric bushing, and the spherical bushing against the seating surface. The fastener can also be positioned at a second position allowing the outer eccentric bushing to float axially and move radially with respect to the central axis.

In one example, the fastener can be a threaded fastener that threads into a top opening of the sleeve and interfaces with a top surface of the outer eccentric bushing.

In one example, the fastener can comprise a conical surface, the outer eccentric bushing can comprise a flexure tab, and the sleeve can comprise a inner radial flange. The conical surface of the fastener can engage with the flexure tab upon at least partial insertion of the fastener into the outer eccentric bushing. Engagement of the flexure tab with the conical surface of the fastener can cause the flexure tab to engage with the inner radial flange.

In another example of the present disclose, a method of facilitating the transfer of shear from a panel to an underlying support is provided. The method can comprise moving the panel towards the underlying support to cause insertion of a pin supported on the underlying support into a through hole of a spherical bushing of an eccentric bushing assembly disposed in an opening in the panel. The opening can define a central axis, and the spherical bushing can rotate to align the through hole with the axis of the pin.

The method can further comprise moving the panel further towards the underlying support, such that an outer eccentric bushing and an inner eccentric bushing of the eccentric bushing assembly interfacing with the spherical bushing are caused to move axially and radially to account for any misalignment of the pin relative to a central axis. The method can further comprise rotating the outer eccentric bushing and the inner eccentric bushing relative to one another to seat the eccentric bushing in a seated position, and securing the eccentric bushing assembly via a fastener interfacing with the outer eccentric bushing.

In one example, the method can further comprise inserting a second pin through a second eccentric bushing assembly disposed in a second opening in the panel. The method can also comprise removing the panel from the underlying support structure by loosening the fastener interfacing with the outer eccentric bushing and pulling the panel away from the underlying support.

In another example of the present disclosure, a system for transferring shear from panels to an underlying support structure is provided. The system can comprise an underlying support structure comprising a plurality of connecting pins attached thereto, a panel operable to be assembled to the underlying support structure, the panel comprising a plurality of opening corresponding to the plurality of connecting pins, and a plurality of eccentric bushing assemblies configured to be disposed in corresponding openings of the panel.

Each eccentric bushing assembly can comprise an outer eccentric bushing comprising a central axis. The outer eccentric bushing can be operable to float axially, rotate circumferentially, and to move radially with respect to the central axis. The eccentric bushing can further comprise an inner eccentric bushing disposed radially inward from the outer eccentric bushing and interfacing with the outer eccentric bushing. The inner eccentric bushing can be operable to rotate relative to the outer eccentric bushing.

The eccentric bushing can also comprise a spherical bushing comprising a through hole operable to receive one connecting pin of the plurality of connecting pins therein. The spherical bushing can interface with the inner eccentric bushing and can be operable to rotate in at least one degree of freedom that facilitates alignment of an axis of the one connecting pin with the through hole. Relative rotation of the outer eccentric bushing and the inner eccentric bushing can facilitate the through hole of the spherical bushing to be radially positioned both centered and off-centered with respect to the central axis.

In one example, the outer eccentric bushing can comprise an outer radial tapered surface that interfaces with an inner tapered surface of the opening.

In one example, the eccentric bushing assembly can comprise an outer sleeve comprising an inner tapered surface. The outer eccentric bushing can comprise an outer radial tapered surface, and the inner tapered surface can interface with the outer radial tapered surface.

To further describe the present technology, examples are now provided with reference to the figures. With reference to FIG. 1, a system for transferring shear from panels to an underlying support structure is provided. As shown in FIG. 1, a system 1 comprises an underlying support structure 10. The underlying support structure 10 can be any structure that supports a plurality of shear panels 12. In one example, the underlying support structure 10 can comprise a framed structure formed with several beams connected to one another. However, the underlying support structure 10 can take on any form. For example, the underlying support structure can be a masonry structure, a concrete structure, or any other structure to which the panel 12 can be attached.

Shear panels 12 can be supported on the underlying support structure 10 on one or more sides of the underlying support structure 10. In other words, the shear panels 12 can be oriented such that a plane defining a length and width of the shear panel is vertical or generally vertical (i.e., within a few degrees of vertical). Thus, when a shear panel 12 is attached to a side of the underlying support structure 10, the weight of the shear panel 12 is transferred to the underlying support structure 10 as a shear force. In some other examples, the shear panels 12 can be supported on the underlying support structure 10 on an incline where at least a portion of the weight of the shear panel 12 is transferred to the underlying support structure 10 as a shear force (i.e., a component of gravitational forces still acts on the panel(s) to induce a shear force).

Other components or parts may also be included and can be formed part of or attached to the underlying support structure 10. As an example shown in FIG. 1, a top panel 14 can be disposed and supported on a top side of the underlying support structure 10. One or more feet 16 can also be used to stabilize the underlying support structure 10. Various other accessories and additions can also be incorporated as necessary depending on the application.

The shear panels 12 can be attached to the underlying support structure 10 via a plurality of eccentric bushing assemblies 100. As will be described in more detail below, the eccentric bushing assemblies 100 facilitate the transfer of shear forces from the panels 12 to the underlying support structure 10 without being over constrained, or rather, the eccentric bushing assemblies 100 are configured to account for and accommodate variations from a nominal or optimal position and orientation of or between the pins (i.e., misalignment, spacing, relative orientation, etc. or between the pins) used to attach the panels 12 to the underlying support structure 10 so that the panels 12 are not supported in an over constrained state. As a result, the eccentric bushing assemblies further facilitate easy removal and reinstallation of the shear panels 12 from and to the underlying support structure 10. The eccentric bushing assemblies 100 can each disposed in respective openings 13 of each of the respective shear panels 12, with the openings 13 being formed as through holes in the various shear panels 12.

Figure 2:
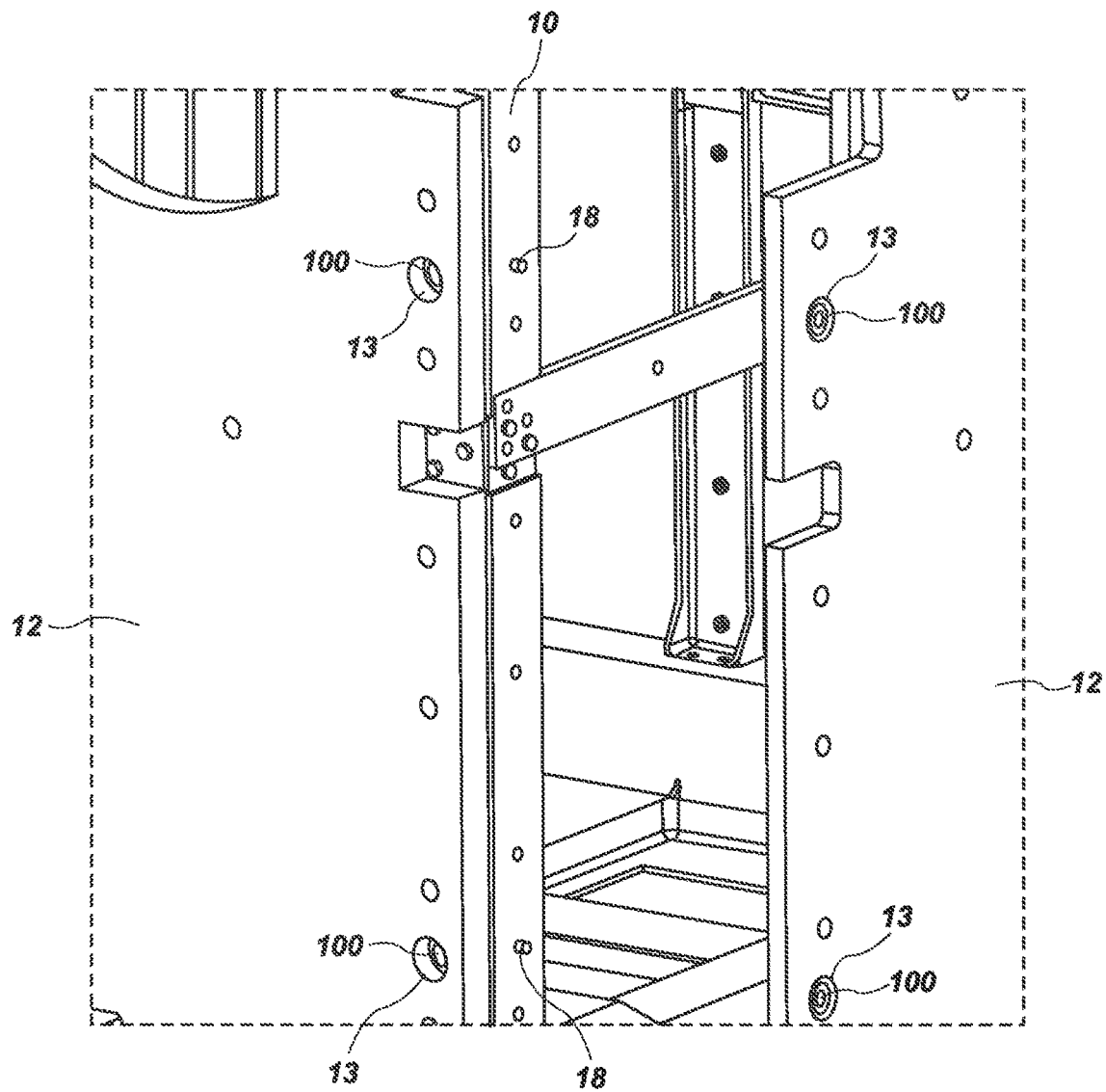
FIG. 2 is a detailed view of a portion of the system shown in FIG. 1 with a shear panel removed from the underlying support structure.
Figure 3B:
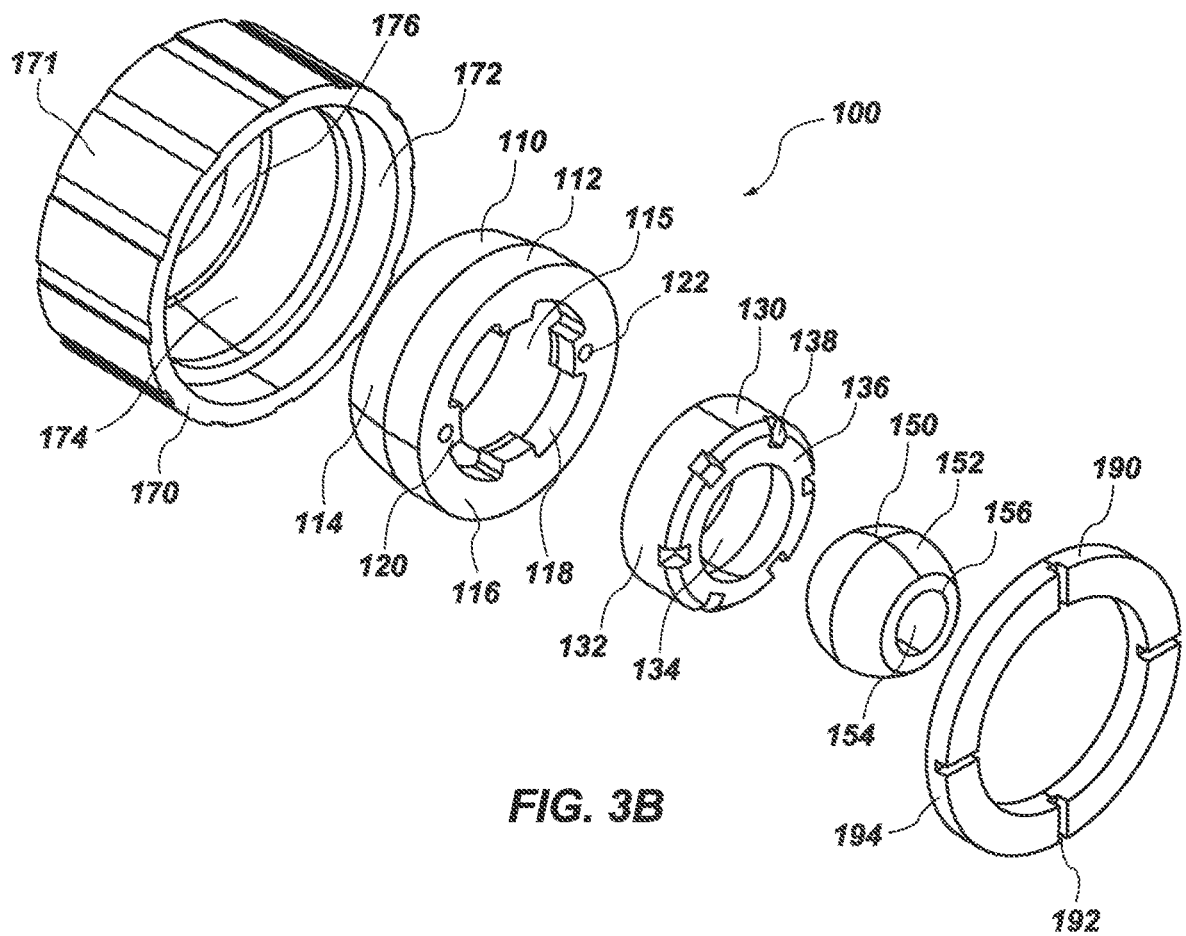
FIG. 3B is an exploded view of the eccentric bushing assembly shown in FIG. 3A.
Figure 3A:
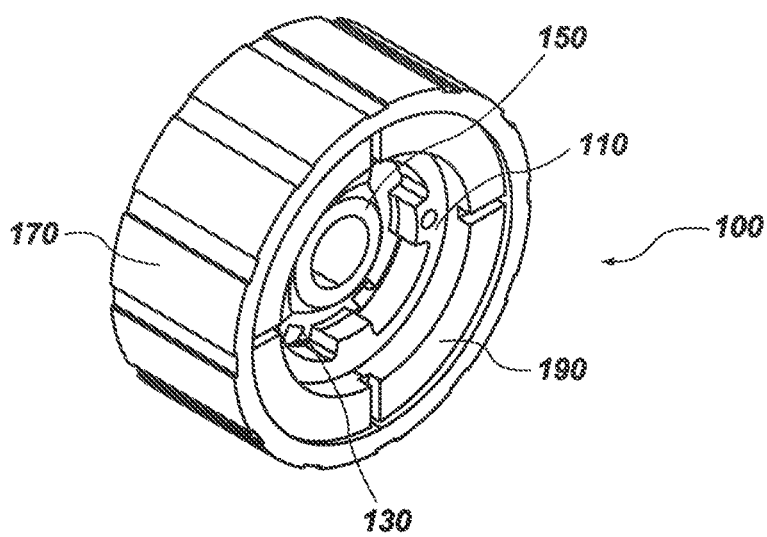
FIG. 3A is an isometric view of the exemplary eccentric bushing assembly used in the system shown in FIG. 1.
Figure 4B:
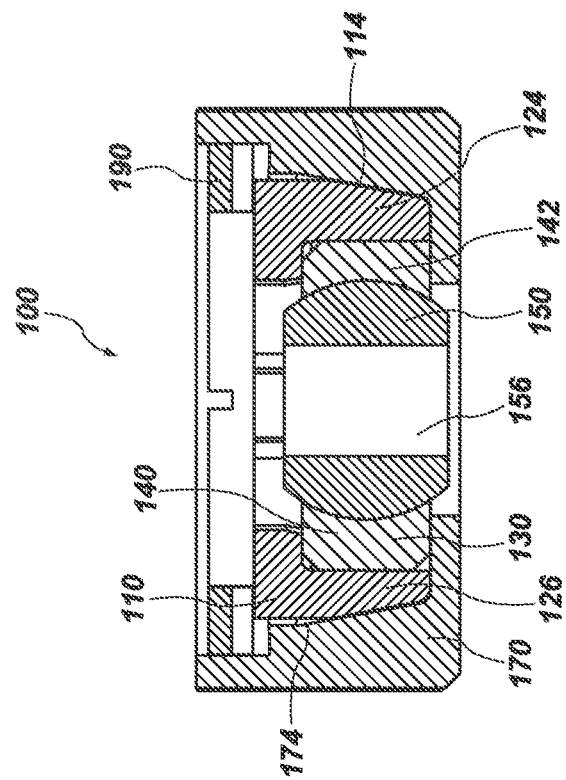
FIG. 4B is a section view of the eccentric bushing assembly taken along the line A-A of FIG. 4A.
Figure 4A:
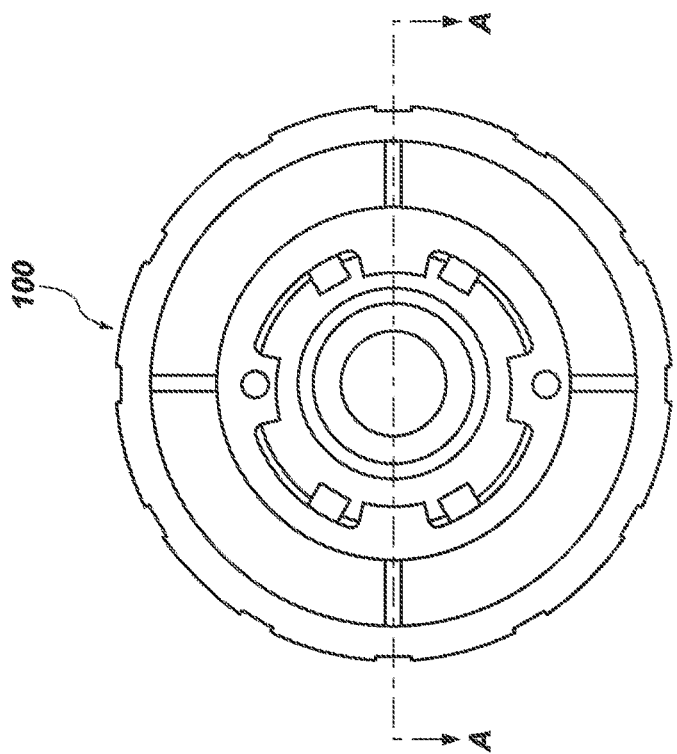
FIG. 4A is a top view of the eccentric bushing assembly shown in FIG. 3A.

FIG. 2 shows an enlarged view of the underlying support structure 10 and shear panels 12 with a shear panel 12 removed from the underlying support structure 10. As shown in FIG. 2, the underlying support structure 10 can have a plurality of pins 18 protruding therefrom to support the one or more shear panels 12. The pins 18 can be operable to extend into the eccentric bushing assemblies 100 to support respective shear panels 12. The pins 18 can be constructed of any suitable material and can be formed integrally with the underlying support structure 10 or can be attached thereto, such as via fasteners, welding, an interference fit, or the like. As can be seen, a single shear panel 12 (and each of the shear panels 12) can be supported about the underlying support structure 10 via a plurality of pins 18.

Referring now to FIGS. 3A-4B, an example of the eccentric bushing assembly 100 will be described. The eccentric bushing assembly 100 can comprise an outer eccentric bushing 110, an inner eccentric bushing 130 that is disposed radially inward from the outer eccentric bushing 110, and a spherical bushing 150 disposed radially inward from the inner eccentric bushing 130. The outer eccentric bushing 110, inner eccentric bushing 130, and spherical bushing 150 can be housed in an outer sleeve 170 and can be maintained in the outer sleeve 170 via a fastener, such as a retaining nut 190.

The outer eccentric bushing 110 can comprise an outer surface 112 that includes an outer radially tapered surface 114. The outer surface 112, including the tapered surface 114, is operable to interface with the outer sleeve 170, as will be described in more detail below. The outer eccentric bushing 110 can further comprise an inner surface 115. The inner surface 115 defines an opening through the outer eccentric bushing 110. The inner surface 115 is formed eccentrically with respect to the outer surface 112. This results in the outer eccentric bushing 110 comprising a relatively thicker portion 124 on one side of the outer eccentric bushing 110 and a relatively thinner portion 126 on the other side of the outer eccentric bushing 110. One or both of the outer surface 112 and the inner surface 115 can comprise surface variations. In one example, the outer surface 112 and/or the inner surface 115 can comprise serrations. A relatively small serration (e.g. 0.005") can aid in preventing micro-motions between the outer eccentric bushing 110 and the outer sleeve 170 and/or the outer eccentric bushing 110 and the inner eccentric bushing 130 in high vibration environments. This can help prevent fretting and can reduce the risk of wear and/or added play in the eccentric bushing assembly 100.

The outer eccentric bushing 110 can further comprise an upper surface 116. The inner surface 115 adjacent to the upper surface 116 can comprise a series of alternating notches 118 and flanges 122. Further, engagement holes 122 can be formed in the upper surface 116 at the flanges 122. The notches 118, flanges 120, and engagement holes 122 can facilitate manipulation of the outer eccentric bushing 110. For example, the notches 118, flanges 120, and engagement holes 122 can facilitate rotation, by a user, of the outer eccentric bushing 110 relative to the outer sleeve 170 and the inner eccentric bushing 130. Of course, other features could also be used to allow a user to manipulate the outer eccentric bushing 110, and thus the notches 118, flanges 120, and engagement holes 122 as shown are merely exemplary. For example, other protrusions, grooves, or any other engagement feature could also be incorporated into the outer eccentric bushing 110 to facilitate manipulation, including rotation, of the outer eccentric bushing 110.

The inner surface 115 of the outer eccentric bushing 110 is operable to interface with the inner eccentric bushing 130. The inner eccentric bushing 130 can comprise an outer surface 132 that is configured to interface with the inner surface 115 of the outer eccentric bushing 110. In some examples, the outer surface 132 can comprise one or more surface variations, such as comprising a serrated surface, to aid in preventing micro-motions between these interfacing surfaces. The inner eccentric bushing 130 can further comprise a spherical inner surface 134 defining an opening through the inner eccentric bushing 130. The spherical inner surface 134 can be operable to interface with the spherical bushing 150.

The spherical inner surface 134 can be formed eccentrically with respect to the outer surface 132 of the inner eccentric bushing 130. This results in the inner eccentric bushing 110 comprising a relatively thicker portion 140 on one side of the inner eccentric bushing 130 and a relatively thinner portion 142 on the other side of the inner eccentric bushing 130.

The inner eccentric bushing 130 can further comprise an upper surface 136 that comprises engagement grooves 138. The engagement grooves 138 can facilitate manipulation of the inner eccentric bushing 130. For example, the engagement grooves 138 can facilitate rotation, by a user, of the inner eccentric bushing 110 relative to the outer eccentric bushing 110. Of course, other features could also be used to allow a user to manipulate the inner eccentric bushing 130, and thus the engagement grooves 138 shown are merely exemplary. For example, other protrusions, grooves, or any other engagement feature could also be incorporated into the inner eccentric bushing 130 to facilitate manipulation, including rotation, of the inner eccentric bushing 130.

The spherical bushing 150 can comprise an outer surface 152 that interfaces with the spherical inner surface 134 of the inner eccentric bushing 130. The interface between the outer surface 152 of the spherical bushing 150 and the spherical inner surface 134 of the inner eccentric bushing 130 facilitates relative rotation between the spherical bushing 150 and the inner eccentric bushing 130 in at least one degree of freedom. For example, the spherical bushing 150 can rotate in at least two directions relative to an axis defined by the opening 13 in the panel 12 (see FIG. 2) or by the outer sleeve 170.

The spherical bushing 150 can comprise an inner surface 154 defining a through hole 156. The through hole 156 can define an axis that can move in one or more directions with respect to the axis of the opening formed by the spherical inner surface 134 of the inner eccentric bushing 130 when the spherical bushing 150 rotates relative to the inner eccentric bushing 130. As will be described in more detail below, the rotation of the spherical bushing 150 relative to the inner eccentric bushing 130 allows the eccentric bushing assembly 100 to accommodate tolerances in the position and/or angles (i.e., orientation) of pins 18 on the underlying support structure 10 (see FIG. 2). For example, the rotation of the spherical bushing 150 in at least two directions can cause the axis of the spherical bushing 150 defined by the through hole 156 to rotate away from an axis defined by the opening 13 of the panel (see FIG. 2), the outer sleeve 170, or the inner eccentric bushing 130, such that the axis of the spherical bushing is no longer aligned with or parallel to the axis of the opening 13, outer sleeve 170, or inner eccentric bushing.

The outer sleeve 170 comprises an outer surface 171 that is operable to interface with an opening 13 in the shear panel 12 (see FIG. 2). For example, the outer surface 171 can comprise a threaded outer surface that can be threaded into corresponding internal threads of the opening 13. In another example, the outer surface 171 of the outer sleeve 170 can be sized and configured to be press fit into the opening 13 of the shear panel 12 to be attached via an interference fit.

The outer sleeve 170 can further comprise a threaded inner surface 172 and a tapered inner surface 174 that terminates at, and that is adjacent to, a seating surface 176. The seating surface 176 can be substantially perpendicular to an axis defined by the opening 13 of the panel 12 (see FIGS. 1 and 2) or by the threaded inner surface 172 of the outer sleeve 170.

The threaded inner surface 172 can be configured to receive and interface with the retaining nut 190. The tapered inner surface 174 of the outer sleeve 170 can be operable to interface with the tapered surface 114 of the outer eccentric bushing 110. The interface between the tapered inner surface 174 of the outer sleeve 170 and the tapered surface 114 of the outer eccentric bushing 110 provides for radial clearance between the outer sleeve 170 and the outer eccentric bushing 110 when the outer eccentric bushing 110 moves axially away from the seating surface 176 of the outer sleeve 170. In some examples, the tapered inner surface 174 and/or the seating surface 176 can comprise one or more surface variations, such as comprising a serrated surface, to aid in preventing micro-motions between these interfacing surfaces.

It should be noted that while in this example the outer sleeve 170 is formed as a component of the eccentric bushing assembly 100 to be inserted into an opening 13 of the shear panel 12, the eccentric bushing assembly 100 can be configured to omit the outer sleeve 170. Instead the opening 13 of the shear panel 12 can be constructed or formed to have an inner geometry similar to that of the outer sleeve 170, wherein the opening 13 is configured to provide the same functionality as the outer sleeve 170. That is, an opening 13 of the shear panel 12 can be formed with a threaded inner surface, a tapered inner surface, and a seating surface to interface with the outer eccentric bushing 130 in the same manner as the outer sleeve 170 as set forth herein to function in a similar manner as the outer sleeve 170.

The retaining nut 190 can comprise engagement grooves 192 and a threaded outer surface 194. The engagement grooves 192 can be operable to facilitate rotation of the retaining nut 190 relative to the outer sleeve 170 (or, as indicated above, the opening 13 of the shear panel if so configured to be similar to and function as the outer sleeve 170). Rotation of the retaining nut 190 relative to the outer sleeve 170 can cause the threaded outer surface 194 of the retaining nut 190 to interface with the threaded inner surface 172 of the outer sleeve 170 to move the retaining nut 190 axially with respect to the outer sleeve 170 (i.e., closer to or farther from the seating surface 176 of the outer sleeve 170).

The retaining nut 190 can be operable to retain and secure in place the outer eccentric bushing 110, the inner eccentric bushing 130, and the spherical bushing 150 within the outer sleeve 170. For example, the retaining nut 190 can be positioned in a first position to hold and lock the outer eccentric bushing 130 (and therefore the inner eccentric bushing 130) against the seating surface 176 and restrict axial motion of the outer eccentric bushing 130 relative to the outer sleeve 170. The retaining nut 190 can also be positioned in a second position to allow the outer eccentric bushing 130 (and therefore the inner eccentric bushing and spherical bushing) to move axially relative to the outer sleeve 170 while still be retained in the outer sleeve 170.

Referring now to FIGS. 1-4B, the eccentric bushing assembly 100 (along with other similarly configured eccentric busing assemblies 100) allows for the shear panel 12 (and other shear panels 12 using respective eccentric bushing assemblies 100) to be assembled (i.e., coupled) to the underlying support structure 10 and to transfer shear to the underlying support structure 10 via the connecting pins 18. The number of eccentric bushing assemblies 100 used to couple a shear panel 12 to the underlying support structure 10 can vary as needed or desired. Moreover, the eccentric bushing assemblies 100 can account for tolerances in the connecting pins 18, such that the shear panels 12 can be assembled to the underlying support structure 10 without being over constrained. This provides for a reliable connection that is not over constrained even when using more than two connecting pins 18. With the shear panel 12 connected to the underlying support structure 10 in this manner, the shear panel 12 can be easily removed from and reinstalled onto the underlying support structure 10. Further, with the shear panel 12 not being over constrained, the shear forces from the shear panel 12 to the underlying support structure 10 can be reliably transferred through and distributed to all of the pins 18 to the underlying support structure 10.

To this end, the spherical bushing 150 is rotatable relative to the inner eccentric bushing 130 in at least one degree of freedom. For example, the spherical bushing 150 can rotate in at least two directions relative to an axis defined by the inner eccentric bushing 130. In some instances, one or more connecting pins 18 may be out of perpendicularity. The spherical bushing 150 is operable to rotate to account for the lack of perpendicularity in a given connecting pin 18.

Further, the interface between the tapered inner surface 174 of the of the outer sleeve 170 and the tapered surface 114 of the outer eccentric bushing 110 provides for radial clearance between the outer sleeve 170 and the outer eccentric bushing 110 when the outer eccentric bushing moves or floats axially away from the seating surface 176 of the outer sleeve 170. This allows the eccentric bushing assembly 100 to account for positional tolerances of the connecting pin 18 relative to one or more other connecting pins 18. The interface of the tapered surface 114 of the outer eccentric bushing 110 and the tapered inner surface 174 of the outer sleeve 170 thus also serves to limit the radial movement of the outer eccentric bushing 110 relative to the outer sleeve 170 depending on the relative axial position of the outer eccentric bushing 110 and the outer sleeve 170.

The eccentricity of the inner surface 115 of the outer eccentric bushing 110 and the spherical inner surface 134 of the inner eccentric bushing 130 further allows the eccentric bushing assembly 100 to account for positional tolerances of the connect pin 18 and to allow the eccentric bushing assembly 100 to be in a seated configuration where the outer eccentric bushing 110 and the inner eccentric bushing 130 are seated against the seating surface 176 of the outer sleeve 170. By rotating the outer eccentric bushing 110 relative to the inner eccentric bushing 130, the radial position of the spherical bushing 150 can effectively move by positioning the relatively thicker portions 124, 142 and the relatively thinner portions 126, 140 of the inner eccentric bushing 110 and the outer eccentric bushing 130 in relation to one another.

For example, when a connecting pin 18 is in a nominal or expected position that is centered relative to the opening 13 of the shear panel 12, the relatively thicker portions 124, 142 and the relatively thinner portions 126, 140 of the inner eccentric bushing 110 and the outer eccentric bushing 130 can be moved to offset one another, placing the spherical bushing 150 substantially centered within the opening 13 or outer sleeve 170 of the eccentric bushing assembly 100. When the connecting pin 18 is positioned offset from the nominal or expected position, the relatively thicker portions 124, 142 and the relatively thinner portions 126, 140 of the inner eccentric bushing 110 and the outer eccentric bushing 130 can be moved closer into alignment to radially move the spherical bushing 150 away from the centered position.

Figure 5A:
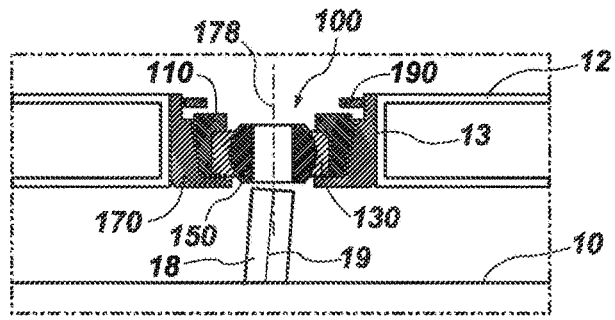
FIGS. 5A-5F show section views of the eccentric bushing assembly of FIG. 3A being used to install a shear panel onto a connecting pin of an underlying support structure, such as that shown in the system of FIG. 1.

FIGS. 5A through 5F show section views of the eccentric bushing assembly 100 being used to install a shear panel 12 onto a pin 18 of an underlying support structure 10 to further illustrate these concepts. In FIG. 5A, a shear panel 12 is positioned towards the underlying support structure 10 to align the eccentric bushing assembly 100 with the connecting pin 18. As shown in FIG. 5A, this particular connecting pin 18 is positioned off-center (i.e., out of the nominally centered position) and is out of perpendicularity (i.e., an axis 19 of the pin 18 is not parallel with respect to a central axis 178 of the outer sleeve 170 or the opening 13).

Figure 5B:
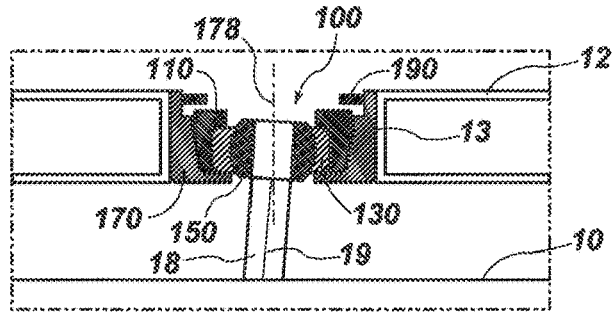

As the shear panel 12 is moved towards the underlying support structure 10, the eccentric bushing assembly 100 engages with the connecting pin 18, as shown in FIG. 5B. Here, the spherical bushing 150 rotates, such that it can receive the connecting pin 18. As mentioned above, the spherical bushing 150 is rotatable in at least one degree of freedom such that the spherical bushing can rotate to accommodate the axis 19 of the connecting pin 18.

Figure 5C:
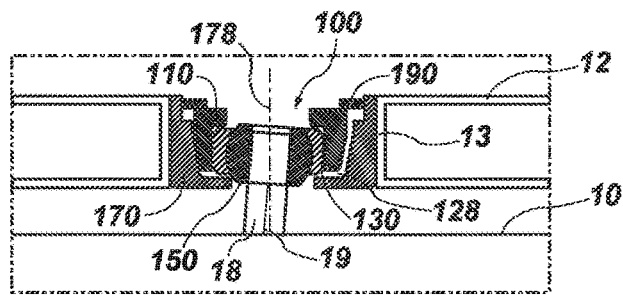

As shown in FIG. 5C, as the shear panel 12 is again moved closer to the underlying support structure 10, the outer eccentric bushing 110 and the inner eccentric bushing 130 can float or move axially. That is, the outer eccentric bushing 110 and the inner eccentric bushing can move away from one another, as well as the seating surface 176 of the outer sleeve 170 (see FIGS. 3A-4B) to provide an axial gap 128 between the seating surface 176 and the outer eccentric bushing 110 and the inner eccentric bushing 130. The axial gap 128 provides radial clearance for the outer eccentric bushing 110 and the inner eccentric bushing 130 to move the spherical bushing 150 radially to accommodate the position of the connecting pin 18.

Figure 5D:
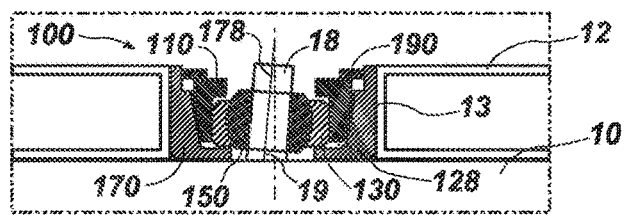

Thus, as shown in FIG. 5D, the shear panel 12 can be moved into an assembled position adjacent to the underlying support structure 10, while the outer eccentric bushing 110 and the inner eccentric bushing 130 accommodate the position of the connecting pin 18. It is also noted that the retaining ring 190 can ensure that the outer eccentric bushing 110 and the inner eccentric bushing 130 are retained within the outer sleeve 170 while the shear panel 12 is moved into position.

Figure 5E:
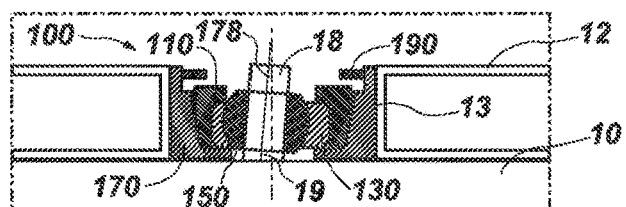

With the shear panel 12 in the assembled position adjacent to the underlying support structure 10 as shown in FIG. 5E, the outer eccentric bushing 110 and the inner eccentric bushing 130 can be rotated to account for the position of the connecting pin 18 and to seat the outer eccentric bushing 110 and the inner eccentric bushing 130 against the seating surface 176 (see FIGS. 3A-4B) of the outer sleeve 170.

Figure 5F:
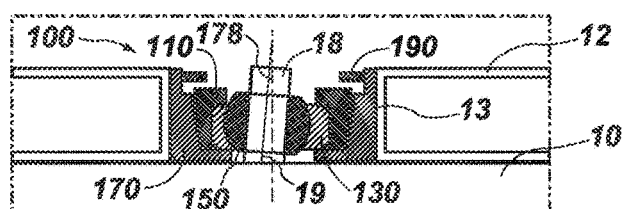

As shown in FIG. 5F, with the outer eccentric bushing 110 and the inner eccentric bushing 130 seated, the retaining nut 190 can be tightened onto the outer eccentric bushing 110 to hold the eccentric bushing assembly in place. Thus, the eccentric bushing assembly 100 can be in a seated position and can effectively account for the position of the connecting pin 18 being off center and for the connecting pin 18 being out of perpendicularity.

It is noted that while FIGS. 5A-5F show a single connecting pin 18 and eccentric bushing assembly 100, the shear panel 12 being installed can have multiple eccentric bushing assemblies 100 that receive multiple connecting pins 18 of the underlying support structure 10 simultaneously (e.g., see FIGS. 1 and 2). The eccentric bushing assemblies' 100 ability to float axially and move radially allows for each of the eccentric bushing assemblies 100 to accommodate a corresponding connecting pin 18 simultaneously. After the shear panel 12 is in an assembled position adjacent to the underlying support structure 10, each eccentric bushing assembly 100 can then be manipulated to move its respective outer eccentric bushing 110 and its respective inner eccentric bushing 130 into the seated position.

With the shear panel 12 so installed, the connection between the shear panel 12 and the connecting pins 18 is not over constrained. Thus, the shear panel 12 can be easily removed from the underlying support structure 10 and reinstalled to the underlying support structure 10 as needed. To do so, the above steps with reference to FIGS. 5A to 5F can be reversed.

It is noted that in the above example, the eccentric bushing assembly 100 is installed into openings 13 of the shear panel 12 prior to assembly onto the pins 18 and the underlying support structure 10. However, in another example, the shear panel 12 can be moved into the assembled position adjacent to the underlying support structure 10 and the eccentric bushing assemblies 100 can be added to the shear panel 12 afterwards. In another example, the outer sleeves 170 of the eccentric bushing assemblies 100 can be inserted into the openings 13 of the shear panel 12 prior to moving the shear panel 12 into the assembled position adjacent to the underlying support structure 10. The rest of the eccentric bushing assemblies 100 (i.e. the outer eccentric bushing 110, the inner eccentric bushing 130, the spherical bushing 150, and the retaining nut 190) can be added to the shear panel 12 afterwards.

Other modifications of an eccentric bushing assembly are further contemplated. In another example, and with reference to FIGS. 6A-6C, an eccentric bushing assembly 200 is disclosed. This example eccentric bushing assembly 200 can also be used with the underlying support structure 10 and shear panels 12 discussed above. The eccentric bushing assembly 200 comprises an outer eccentric bushing 210, an inner eccentric bushing 230, a spherical bushing 250, an outer sleeve 270, and fasteners 290. The outer eccentric bushing 210, inner eccentric bushing 230, spherical bushing 250, and outer sleeve 270 are substantially similar to the outer eccentric bushing 110, inner eccentric bushing 130, spherical bushing 150, and outer sleeve 170, respectively, as discussed above. As such, the above description can be referred to for an understanding of these, and thus a full description of these parts is omitted here, the discussion below describing the differences between the exemplary eccentric bushing assembly 200 from that of the exemplary eccentric bushing assembly 100.

In this example, the outer sleeve comprises an inner radial flange 280 that is disposed near a top of the outer sleeve 270. The inner radial flange 280 is operable to retain the outer eccentric bushing 210, the inner eccentric bushing 230, and spherical bushing 250 within the outer sleeve 270. The outer eccentric bushing 210 comprises a plurality of flexure tabs 244 that interface with the inner radial flange 280.

The fasteners 290 comprise a fastener head 296 and a threaded shaft. The threaded shaft is operable to be inserted into the outer eccentric bushing 210. The fastener head 296 comprises a frustoconical surface 297. The frustoconical surface 297 can be configured to engage and interface with the flexure tab 244 of the outer eccentric bushing 210 to retain the outer eccentric bushing in the outer sleeve 270. In this example, when the fasteners 290 are loosened, the frustoconical surface 297 of the fasteners 290 is out of engagement with the flexure tabs 244 so that the outer eccentric bushing 210 can float axially and move radially. When the fasteners 290 are tightened, the frustoconical surface 297 of the fasteners 290 engages the corresponding flexure tab 244, such that the flexure tab 244 is pushed towards the inner radial flange 280 to further engage with the inner radial flange 280 of the outer sleeve 270. This locks the outer eccentric bushing 210 in the seated position.

It is noted that although the surfaces that interface with one another in the various example eccentric bushing assemblies discussed above are shown as comprising a smooth surface, which can facilitate greater ease of rotational adjustment between interfacing surfaces, this is not intended to be limiting in any way. As indicated above, these interfacing surfaces can comprise one or more surface variations in order to improve rotational stability and locking, even if this is at the cost of adjustability to some extent. In high vibration or shock environments the addition of surface variations, such as serrations, at these interfaces can indeed improve rotational stability and locking. The configuration of the surface variations can vary as needed or desired. For example, the height of the serrations can be configured to permit adequate axial clearance for the above-discussed components of the eccentric bushing assembly during alignment while retaining positive locking potential. Moreover, the pitch of the serrations can be adjusted to achieve the minimum angular adjustment increment. In one example, the serrations can be on the order of 0.005", which would provide substantial locking while requiring minimal adjustments to achieve the axial clearance required during adjustment. Of course, other dimensions are possible and contemplated herein.

Figure 6A:
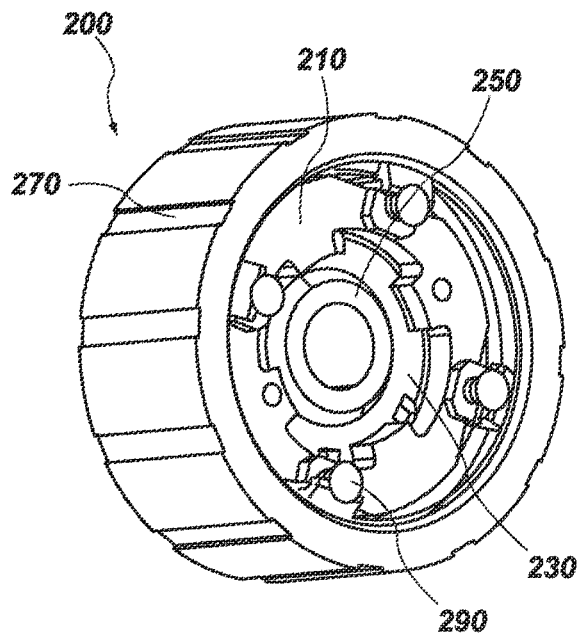
FIG. 6A is an isometric view of another example of an eccentric bushing assembly configured for use in the system shown in FIG. 1.
Figure 6B:
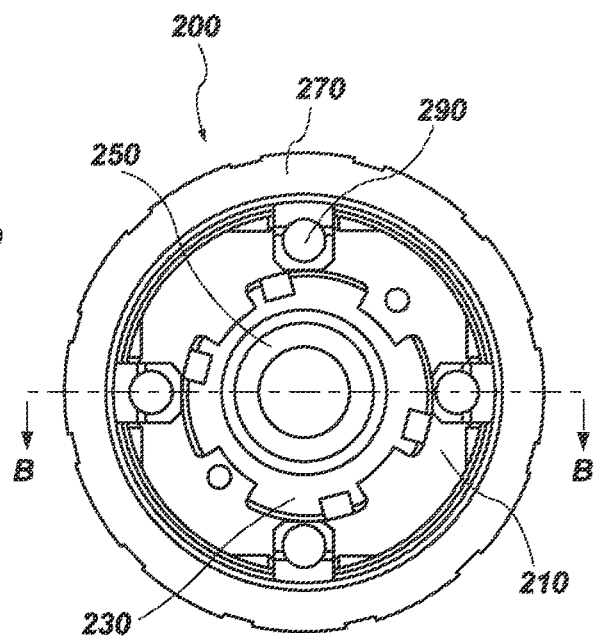
FIG. 6B is a top view of the eccentric bushing assembly shown in FIG. 6A.
Figure 6C:
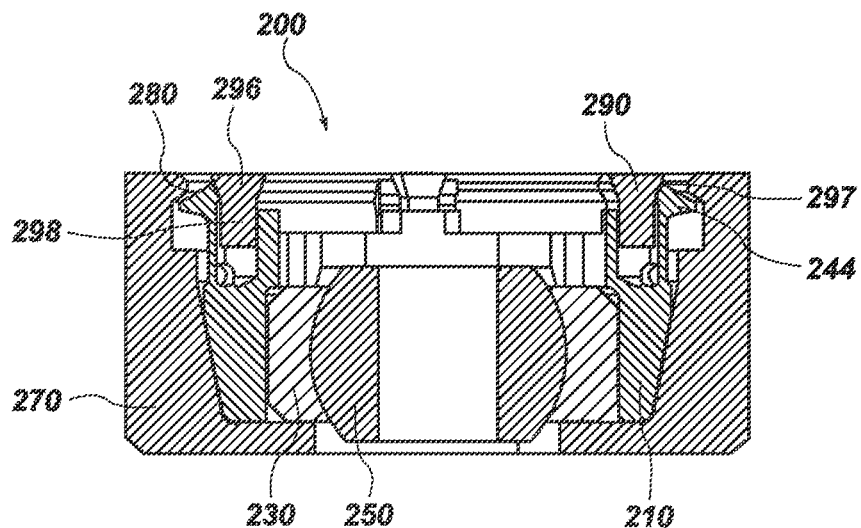
FIG. 6C is a section view of the eccentric bushing assembly taken along the line B-B of FIG. 6B.

It is noted that in this example shown in FIGS. 6A-6C, the outer sleeve 270 can be formed integrally with the opening 13 in the panel 12 (see FIGS. 1 and 2) instead of being formed as a component of the eccentric bushing assembly 200. Other modifications can also be made without departing from the present disclosure.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An eccentric bushing assembly comprising:
    an outer eccentric bushing configured to be disposed in an opening of a panel, the opening comprising a central axis, the outer eccentric bushing being operable to float axially, rotate circumferentially, and to move radially with respect to the central axis;
    an inner eccentric bushing disposed radially inward from the outer eccentric bushing and interfacing with the outer eccentric bushing, the inner eccentric bushing being operable to rotate relative to the outer eccentric bushing; and
    a spherical bushing comprising a through hole operable to receive a connecting pin therein, the spherical bushing interfacing with the inner eccentric bushing and being operable to rotate in at least one degree of freedom that facilitates alignment of an axis of the pin with the through hole,
    wherein relative rotation of the outer eccentric bushing and the inner eccentric bushing facilitate the through hole of the spherical bushing to be radially positioned both centered and off-centered with respect to the central axis, and wherein:
        the outer eccentric bushing comprises an outer radial tapered surface, the outer radial tapered surface configured to interface with a corresponding tapered inner surface to limit radial movement of the outer eccentric bushing; and
        the corresponding tapered inner surface terminates at a seating surface perpendicular to the central axis, and wherein the relative rotation of the outer eccentric bushing and the inner eccentric bushing facilitates the through hole of the spherical bushing to be radially positioned in one of a centered and an off-centered position with respect to the central axis when the outer eccentric bushing and the inner eccentric bushing are seated against the seating surface.

2. The eccentric bushing assembly of claim 1, further comprising a fastener interfacing with the outer eccentric bushing to retain the outer eccentric bushing, the inner eccentric bushing, and the spherical bushing.

3. The eccentric bushing assembly of claim 2, wherein the fastener is operable to be positioned at a first position interfacing with the outer eccentric bushing to lock a position of the outer eccentric bushing, the inner eccentric bushing, and the spherical bushing against the seating surface, and at a second position allowing the outer eccentric bushing to float axially and move radially with respect to the central axis.

4. The eccentric bushing assembly of claim 2, wherein the fastener is a threaded fastener that threads into the opening of the panel and interfaces with a top surface of the outer eccentric bushing.

5. The eccentric bushing assembly of claim 2, wherein the fastener comprises a conical surface, the outer eccentric bushing comprises a flexure tab, and the opening of the panel comprises an inner radial flange, wherein the conical surface of the fastener engages with the flexure tab upon at least partial insertion of the fastener into the outer eccentric bushing, and wherein engagement of the flexure tab with the conical surface of the fastener causes the flexure tab to engage with the inner radial flange.

6. The eccentric bushing assembly of claim 1, further comprising an outer sleeve interfacing with the opening of the panel, the outer sleeve comprising the corresponding tapered inner surface that interfaces with the outer radial tapered surface of the outer eccentric bushing to limit radial movement of the outer eccentric bushing.

7. The eccentric bushing assembly of claim 6, wherein the outer sleeve comprises the seating surface that is adjacent to the corresponding tapered inner surface.

8. The eccentric bushing assembly of claim 7, further comprising a fastener interfacing with the outer eccentric bushing to retain the outer eccentric bushing, the inner eccentric bushing, and the spherical bushing, wherein the fastener is operable to be positioned at a first position interfacing with the outer eccentric bushing to lock a position of the outer eccentric bushing, the inner eccentric bushing, and the spherical bushing against the seating surface, and at a second position allowing the outer eccentric bushing to float axially and move radially with respect to the central axis.

9. The eccentric bushing assembly of claim 6, further comprising a fastener interfacing with the outer eccentric bushing to retain the outer eccentric bushing, the inner eccentric bushing, and the spherical bushing.

10. The eccentric bushing assembly of claim 9, wherein the fastener is a threaded fastener that threads into a top opening of the outer sleeve and interfaces with a top surface of the outer eccentric bushing.

11. The eccentric bushing assembly of claim 9, wherein the fastener comprises a conical surface, the outer eccentric bushing comprises a flexure tab, and the outer sleeve comprises a inner radial flange, wherein the conical surface of the fastener engages with the flexure tab upon at least partial insertion of the fastener into the outer eccentric bushing, and wherein engagement of the flexure tab with the conical surface of the fastener causes the flexure tab to engage with the inner radial flange.

12. The eccentric bushing assembly of claim 1, wherein the corresponding tapered inner surface and the seating surface are each formed in the opening of the panel.

13. A system for transferring shear from panels to an underlying support structure comprising:
- an underlying support structure comprising a plurality of connecting pins attached thereto;
- a panel operable to be assembled to the underlying support structure, the panel comprising a plurality of openings corresponding to the plurality of connecting pins; and
- a plurality of eccentric bushing assemblies configured to be disposed in corresponding openings of the panel, each eccentric bushing assembly comprising:
  - an outer eccentric bushing comprising a central axis, the outer eccentric bushing being operable to float axially, rotate circumferentially, and to move radially with respect to the central axis;
  - an inner eccentric bushing disposed radially inward from the outer eccentric bushing and interfacing with the outer eccentric bushing, the inner eccentric bushing being operable to rotate relative to the outer eccentric bushing; and
  - a spherical bushing comprising a through hole operable to receive one connecting pin of the plurality of connecting pins therein, the spherical bushing interfacing with the inner eccentric bushing and being operable to rotate in at least one degree of freedom that facilitates alignment of an axis of the one connecting pin with the through hole, wherein relative rotation of the outer eccentric bushing and the inner eccentric bushing facilitates the through hole of the spherical bushing to be radially positioned both centered and off-centered with respect to the central axis, and wherein:
- the outer eccentric bushing comprises an outer radial tapered surface, the outer radial tapered surface configured to interface with a corresponding tapered inner surface of the opening of the panel to limit radial movement of the outer eccentric bushing; and
- the corresponding tapered inner surface of the opening of the panel terminates at a seating surface of the panel perpendicular to the central axis, and wherein the relative rotation of the outer eccentric bushing and the inner eccentric bushing facilitates the through hole of the spherical bushing to be radially positioned in one of a centered and an off-centered position with respect to the central axis when the outer eccentric bushing and the inner eccentric bushing are seated against the seating surface.

\* \* \* \* \*